United States Patent [19]
Landrum, Jr.

[11] 3,731,268
[45] May 1, 1973

[54] TIME-COMPRESSING MULTI-TRANSMISSION SIGNALS

[75] Inventor: Ralph A. Landrum, Jr., Tulsa, Okla.
[73] Assignee: Amoco Production Company, Tulsa, Okla.
[22] Filed: Dec. 7, 1970
[21] Appl. No.: 95,964

Related U.S. Application Data

[63] Continuation-in-part of Ser. No. 796,348, Feb. 4, 1969, abandoned.

[52] U.S. Cl.............340/15.5 TA, 340/15.5 CP, 340/15.5 CF, 340/15.5 DP
[51] Int. Cl. .............................................. G01v 1/28
[58] Field of Search ............... 340/15.5 TA, 15.5 DP; 324/77 G, 77 CF

[56] References Cited

UNITED STATES PATENTS

| | | | |
|---|---|---|---|
| 3,182,743 | 5/1965 | McCollum | 340/15.5 TA |
| 3,523,277 | 8/1970 | Landrum, Jr. | 340/15.5 TA |
| 3,300,754 | 1/1967 | Lee et al. | 340/15.5 TA |

OTHER PUBLICATIONS

Digital Processing of Seismic Data, Daniel Silverman, Geophysics, Vol. 32, No. 6, Dec. 1967, pp. 988–1002.

*Primary Examiner*—Benjamin A. Borchelt
*Assistant Examiner*—H. A. Birmiel
*Attorney*—Paul F. Hawley et al.

[57] ABSTRACT

For each seismic receiver location $n$ multi-transmission signals, which are similar in form but differ in peak frequency within a frequency range of interest, are time-compressed by cross-correlating the received signals containing it with each transmitted signal alone, weighting the resulting $n$ correlation functions to produce for each event arrival the simplest compressed central wavelet when said $n$ correlation functions are added with zero-lag times in coincidence, summing the weighted correlogram traces, and Wiener filtering the summation trace to reduce its amplitudes substantially to zero outside of said central wavelets.

8 Claims, 8 Drawing Figures

Patented May 1, 1973 3,731,268

INVENTOR.
RALPH A. LANDRUM, JR
BY Newell Pottorf
ATTORNEY

INVENTOR.
RALPH A. LANDRUM, JR.
ATTORNEY

FIG. 8

TIME-COMPRESSING MULTI-TRANSMISSION SIGNALS

CROSS-REFERENCE TO RELATED APPLICATION

This application is a continuation-in-part of my copending application Ser. No. 796,348, filed Feb. 4, 1969, and now abandoned.

BACKGROUND OF THE INVENTION

This invention relates to seismic geophysical surveying, and is directed to seismic surveying utilizing multi-transmission signals, each of which may be of substantial time duration and may be imparted to the earth by one or more servo-controlled vibrators. Specifically, the invention is directed to time-compressing multi-transmission signals which collectively span an appreciable range of frequencies, to produce brief events or indications of travel times by various paths through the earth between points of wave generation and reception. As a typical and preferred example of multi-transmission signals, each of the several signals forming a multi-transmission set may comprise a truncated mono-frequency wave train consisting of a number of cycles of constant sinusoidal frequency that start and stop more or less abruptly, the different mono-frequencies of the successive trains lying at various points within a range of frequencies chosen depending upon the seismic information required and the characteristics of the explored area. Truncated mono-frequency wave trains, however, are not the only form of multi-transmission signals that may be used, as Ricker wavelets of different breadths and other wave forms of arbitrary or non-sinusoidal character having spectra which are similar but with different peak frequencies, which peak frequencies lie within the frequency range to be utilized, may be employed as the multi-transmission signals.

Multi-transmission signals of the truncated mono- or constant-frequency wave train type have been proposed and used for seismic surveying, for example, in the manner taught by McCollum U.S. Pat. No. 3,182,743. It is there shown that by proper choice of the wave-train length and of the specific mono-frequencies such that they correspond to successive terms of a Fourier series, a simple summation with the proper time relationship produces an optimum time compression of the received waves to show brief events signifying wave travel times. Establishing the "proper" time relationship is a matter of some difficulty at times, however, in that re-adjustment of the relative times of the received waves from the different transmissions may be required to optimize the summation at the central wavelet and to minimize the amplitudes of other wavelets in the summation-wave train. Also, the choice and control of the necessary precise frequencies dictated by the Fourier series relationship may not be convenient or even possible with certain types of vibration generators. Further, the limitation of the wave-train length to avoid multiple summation maxima may also reduce the energy input to an amount less than the optimum.

The process of correlation between a counterpart of the input signal and the received waves is a well known time-compressing technique, but it has only limited usefulness for constant-frequency waves as compared with those for which the frequency varies with time, such as linearly in a frequency sweep, for the reason that the correlation of two sine waves is itself another sine wave.

The technique of Wiener filtering has been proposed for transforming wave trains of appreciable length into relatively shorter pulses, but for a transmitted sequence of truncated mono-frequency wave trains of the type contemplated in the McCollum patent and in the present application, the required Wiener filter operators are of such length as to make them difficult to use and costly in terms of digital computer operations.

It is accordingly a primary object of the present invention to effectively time-compress multi-transmission signals by a specific combination of the summation, correlation, and Wiener-filtering techniques that avoids most of the problems and difficulties of the prior art. Specifically, this time-compression is to be accomplished without important limitations on the length of the individual mono-frequency wave trains or on their relation to a Fourier series progression of frequencies, but with automatic adjustment of timing for summation and with Wiener-filtering operators of reasonable length.

SUMMARY OF THE INVENTION

Stated briefly, the time-compression of received multi-transmission seismic signals by a combination of cross-correlation, weighted summation, and Wiener-filtering steps employs data obtained using an ordinary field surveying layout. Seismic waves are transmitted from one or more vibrators at a wave-input location to one or more seismic receivers spaced therefrom at a wave-receiving location or spread. Simultaneously, by a monitor receiver, a recording is made of the seismic waves actually entering the earth at the input point. This monitor-receiver recording serves two functions: it acts as a reference or standard against which to compensate or equalize the other received-wave traces for varying conditions such as variations in the vibrator input to the earth, ground coupling conditions, attenuation of waves during travel, and the like; and the data-processing parameters determined to time-compress the monitor trace are those used to time-compress the spread receiver traces.

After making any appropriate compensation or equalization of the received waves of the different transmissions, each received signal is cross-correlated with each individual one of the input multi-transmission signals that produced it. That is, where there are $n$ multi-transmissions signals sent from one transmitter to one receiver location, there will be produced $n$ correlogram traces for that one receiver location. This correlation step produces for each correlogram trace one zero-lag time indication at which the correlation is a maximum, which time is then available to serve as the zero-reference time for the subsequent summation. In addition, any noise outside of the narrow frequency band occupied by the individual input signal being cross-correlated is attenuated, resulting in a markedly improved signal-to-noise ratio in the final time-compressed trace.

Before or in the course of making the correlogram trace summation, relative weighting factors are applied to the respective correlogram traces. These are factors determined by operating upon the monitor-receiver trace primarily so as to equalize as nearly as possible the energy contributed by each transmission to the total energy present in all transmissions throughout the frequency range covered by the *n* transmitted monofrequency signals. These weighting factors may also include minor adjustments of the "equal-energy" factors such as to minimize subsidiary waves preceding and following the central wavelet of the summation trace obtained utilizing the monitor-receiver signals.

Then, utilizing the zero-lag times determined in the cross-correlation step for alignment, and applying the optimum set of correlogram weighting factors determined for the monitor-receiver trace, the *n* correlogram traces for each spread receiver are aligned and summed to produce a summation correlogram trace. Finally, utilizing the well-known Wiener-filtering technique, a Wiener-filter operator, previously determined to suppress the waves preceding and following the central wavelet of the monitor-receiver correlation summation trace, is applied to the weighted correlogram summation trace representing a given spread receiver location. The output trace from this Wiener-filtering process is then the time-compressed trace representing the wave arrivals at the corresponding spread receiver location, which trace is then available for any further processing that may be desired such as corrections for elevation, weathering travel time, normal moveout, deconvolution, frequency filtering, and any other techniques applied in conventional processing of seismic data to produce cross sections or other displays.

BRIEF DESCRIPTION OF THE DRAWINGS

The invention will be better understood from the detailed description to follow taken with the accompanying drawings forming a part of this application. In these drawings.

DESCRIPTION OF THE PREFERRED EMBODIMENTS

Figure 1:
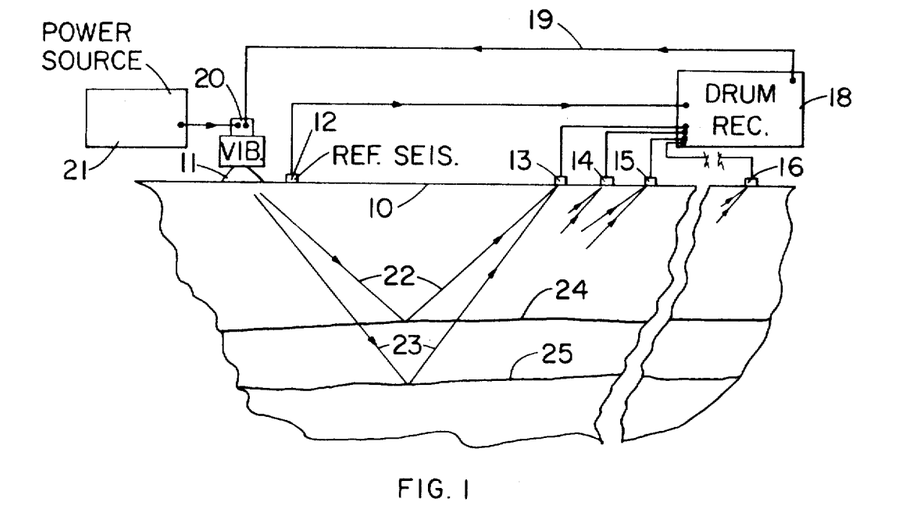
FIG. 1 is a diagrammatic cross-section view of the earth with apparatus for obtaining data to be processed in accordance with the invention in operating position thereon.

Referring now to the drawings, and particularly to FIG. 1 thereof in detail, this figure shows in highly diagrammatic form an earth cross section and an embodiment of field-recording apparatus for obtaining data to be processed in accordance with the invention. On the ground surface 10 at a chosen location for wave generation is a vibrator 11. Close by or attached to the vibrator base plate is a reference or monitor seismometer 12. At some distance away on surface 10 is a seismometer receiver spread 13–16, each receiver such as 13 representing what is conventionally a seismometer group covering a certain linear or areal span of the ground surface, as is conventional in the seismic surveying art. By appropriate electrical leads, the respective seismometers 13–16 are connected to the separate recording channels of a drum recorder 18. From recorder 18 a lead 19 extends to the servo-control unit 20 of vibrator 11, to control the power transmitted through the vibrator and thence to the ground from a power source 21 in accordance with a trace form prerecorded on the drum of recorder 18.

As is shown by the drawing, signals travel directly from vibrator 11 to reference seismometer 12, and by various paths through the earth, such as the paths 22 and 23 from subsurface reflecting interfaces 24 and 25, to the receivers 13–16. As is apparent, this is a conventional seismic surveying field layout, the novelty of the present invention residing not in the field recording procedures, but in the use of particular forms of input signal and in the subsequent processing of the received waves at monitor-seismometer 12 and spread seismometers 13–16 now to be described.

Figure 2:
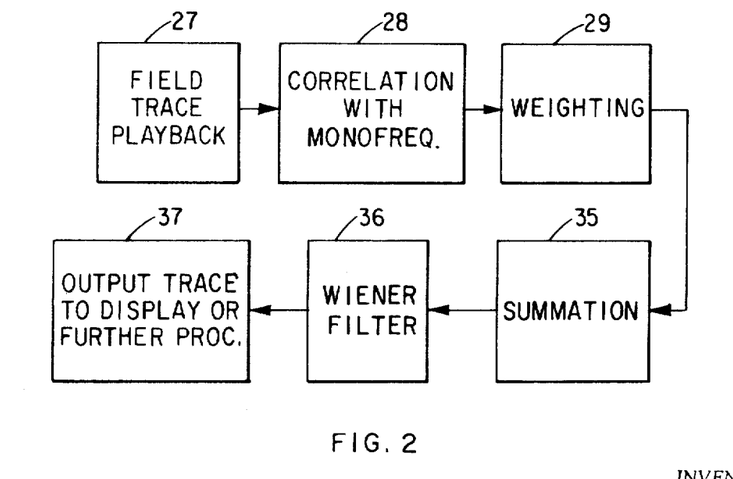
FIG. 2 is a block diagram of the time-compression process of the invention.

In FIG. 2 is shown in block-diagram form the data reduction process of this invention, as it is applied first to the trace or traces which record the output of monitor seismometer 12, and subsequently to the trace or traces which record the output of each of the spread receivers 13–16. A playback unit 27 reproduces each input or monitor trace as a corresponding electrical signal input to a correlator 28, which is programmed to cross-correlate the trace with each individual one of the *n* multi-transmission signals that produced it. The resulting *n* correlogram signals or traces, given proper relative weights by a unit 29, containing *n* calibrated attenuators, for example, are summed by a unit 35, the summation signal or trace is filtered by a Wiener filter 36 to further improve the time compression, and the filter output is finally transmitted to a unit 37 for display or further processing by any desired conventional means.

Figure 3:
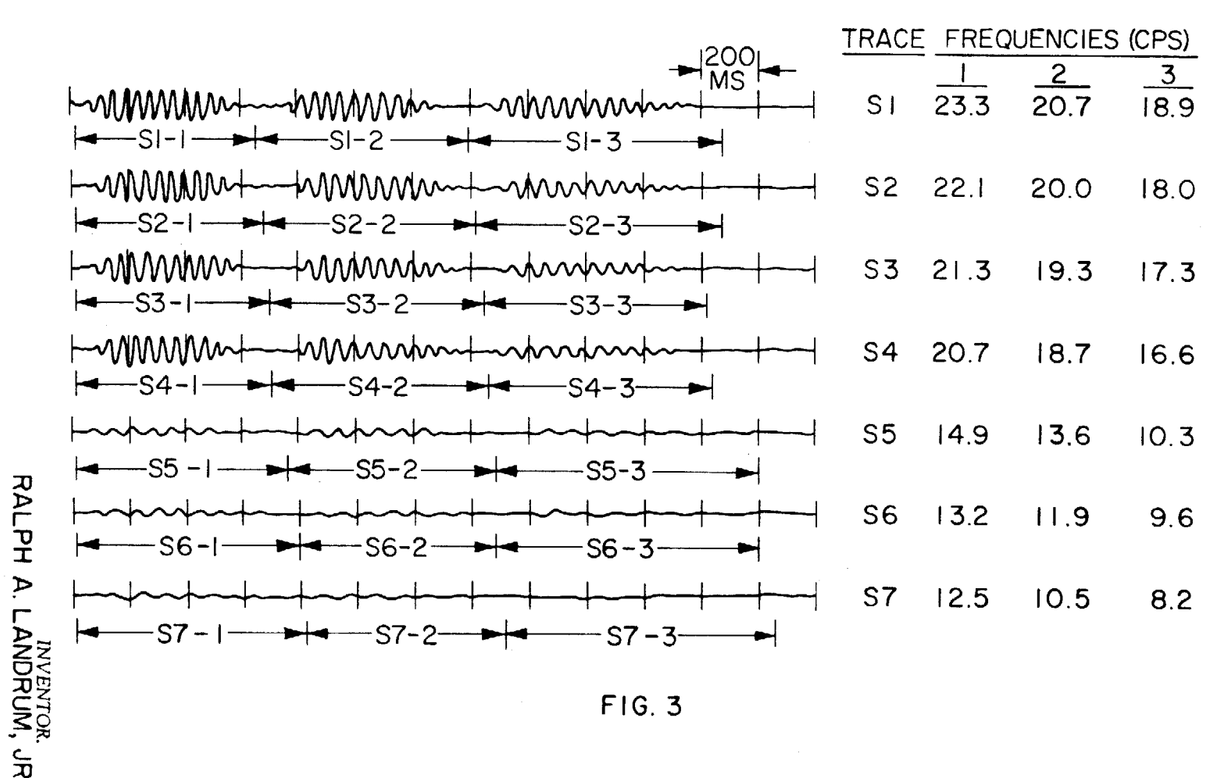
FIG. 3 is a graphical and tabular representation of a particular set of mono-frequency signals utilized in a field test of the invention.

In FIG. 3 are shown seven traces comprising a set of 21 mono-frequency signals recorded in the course of a field test of the invention by a reference seismometer 12 adjacent a vibrator 11 of experimental design. These 21 signals were transmitted three in sequence at a time resulting in seven recorded traces for the monitor-seismometer 12 and for each of the spread seismometers 13–16. The sequential transmission of the signals in groups of three each was required by the particular design of the vibrator, which included mechanically tuned systems that resonated at any of three particular frequencies, which frequencies are those shown in the tabulation on the right-hand side of the figure. Changing the tuning to a different group of three required a longer time interval than was available between the three wave trains of each group. The control signals actually fed from recorder 18 over lead 19 to servo-control 20 of vibrator 11 were reversing-polarity square waves at the respective frequencies shown, the resonance of the system and possibly additional low-pass filtering serving to convert the square-wave drive signals to essentially sinusoidal mono-frequency signals of the form shown in FIG. 3.

The use of twenty-one mono-frequencies and their transmission in groups of three in sequence to produce seven traces is by way of example only, as regards the number of mono-frequencies and the manner in which they may be introduced into the earth. With a different form of servo-controlled vibrator, all 21 (or other desired total number) of the mono-frequency wave trains could have been transmitted one after the other in a continuous sequence without interruption. Alternatively, each mono-frequency wave train could have been transmitted and its resulting waves received and recorded alone, before transmitting and recording a succeeding mono-frequency wave train.

As the table shows, the actual frequencies in this example varied from a lowest frequency of 8.2 cycles per second to a highest frequency of 23.3 cycles per second. From the table it will be apparent that the particular frequencies, dictated by resonances of the vibrator 11, were distributed non-linearly through the range from 8.2 to 23.3 cycles, there being some concentration of transmitted frequencies in the upper and lower portions of the range and relatively fewer frequencies near the mid-range of about 15 or 16 cycles per second.

As a preliminary step in the analysis of the monitor and spread seismometer received-wave traces, there is performed an equalization or compensation step wherein the individual traces, or the individual mono-frequencies of these traces, are adjusted relative to each other in amplitude to remove the effects of such varying conditions as changing vibrator output, unequal sensitivities in detectors, different ground coupling conditions, and the like. As such equalization or compensation procedure is routinely performed and well known to those skilled in the art of seismic surveying, no detailed description is believed necessary other than to point out that it can usually conveniently be done by minor gain-control adjustments in the recording-playback amplifiers.

Figure 4:
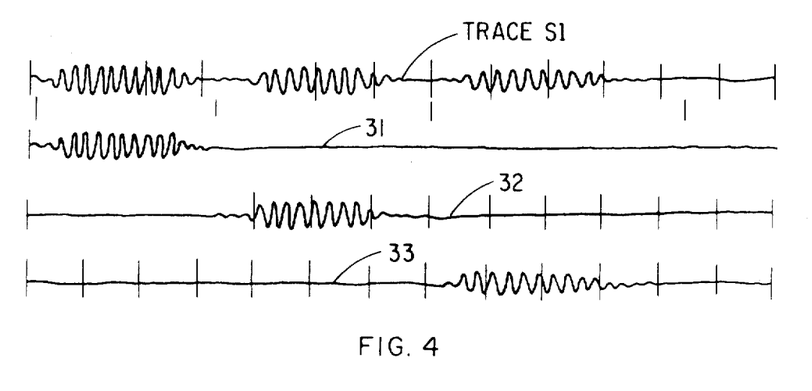
FIG. 4 is a graph of traces showing the correlation procedure.

The steps of analysis which are the essence of the present invention comprise, first, determining the processing parameters for time-compressing the signals recorded by monitor-receiver 12, and then applying the same parameters during processing of the received-wave traces from the spread seismometers 13–16. The first step in this time-compression analysis therefore comprises cross-correlating each of the seven monitor-receiver traces of FIG. 3 with each of the three mono-frequency wave trains involved in the making of the recorded trace. Thus, from trace $S_1$ of FIG. 3, three correlogram traces are derived respectively correlating it with the first, then with the second, and finally with the third mono-frequency wave train. That is, as is shown in FIG. 4, a first correlogram trace is made by correlating trace $S_1$ with trace 31, which corresponds to trace $S_1$ with the second and third mono-frequencies reduced to zero amplitude. The second correlogram trace is made by correlating trace $S_1$ with trace 32, in which the first and third mono-frequencies are at zero amplitude, while the third correlogram trace is made by correlating trace $S_1$ with trace 33 in which the first two mono-frequencies have zero amplitude.

Figure 5:
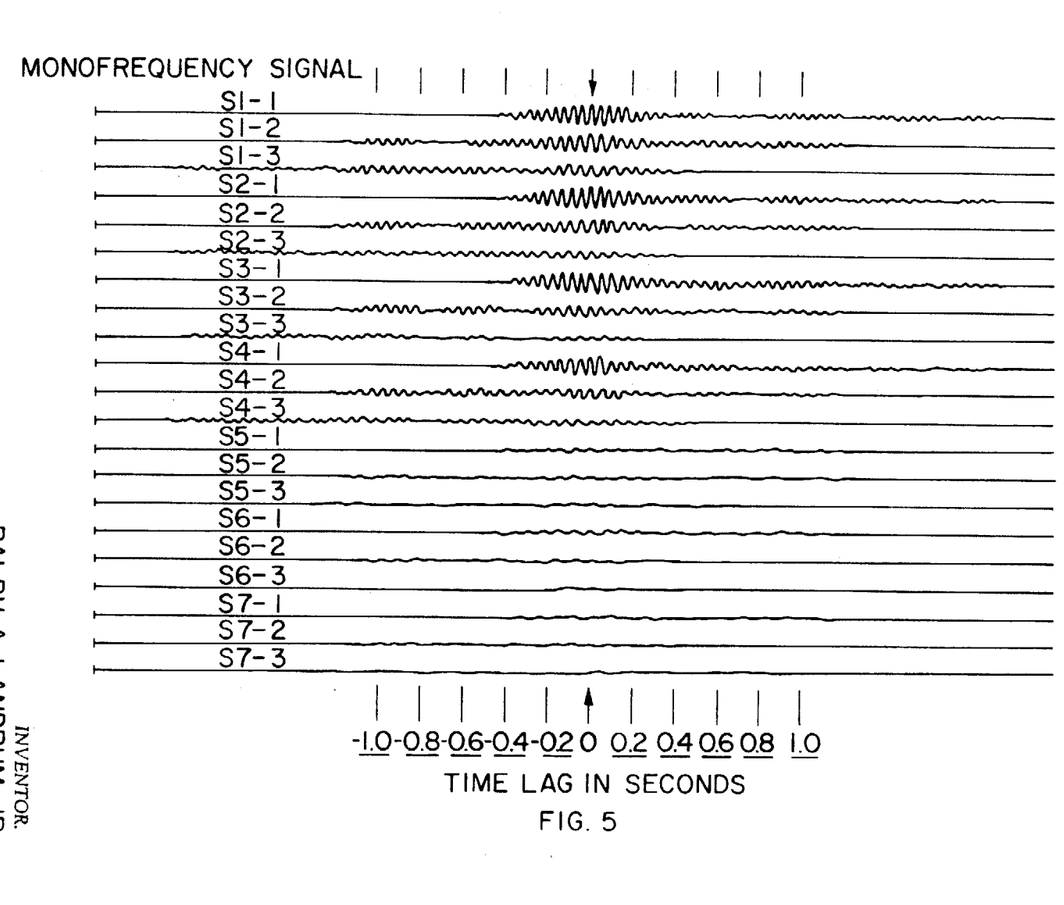
FIG. 5 is a graphical representation of correlogram traces obtained on monitor-receiver signals in accordance with the invention.

The first three of the 21 traces of FIG. 5 are the three correlogram traces made in the manner just stated. The remainder of the 21 correlogram traces of FIG. 5 are made in an analogous way, by respectively correlating each of the three mono-frequencies contained in trace $S_2$ with that trace, and so on. By properly coordinating the recorded trace times and the timing of the individual mono-frequency signals in the traces 31, 32, etc., used for correlating, the maximum values of the correlogram traces are obtained in time alignment as shown in FIG. 5, taken with respect to the time delay or lag time in seconds as shown at the bottom of the figure. As compared with the placing of individual mono-frequency wave trains in the proper time coincidence for maximizing a single peak or trough as taught in the McCollum patent, which frequently requires some time adjustments, the alignment of traces for summation in the present case is substantially automatic. With this alignment established, the problem then becomes that of selecting the proper relative weighting factors to produce the simplest form of central wavelet in the summation trace that is produced by adding the 21 correlogram traces.

Figure 6:
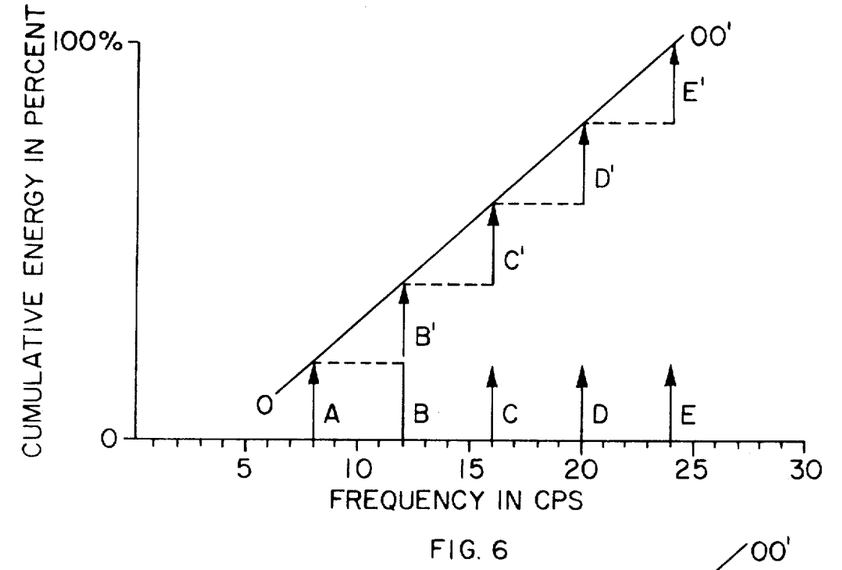
FIGS. 6 and 7 are graphs illustrating the derivation of weighting factors.
Figure 7:
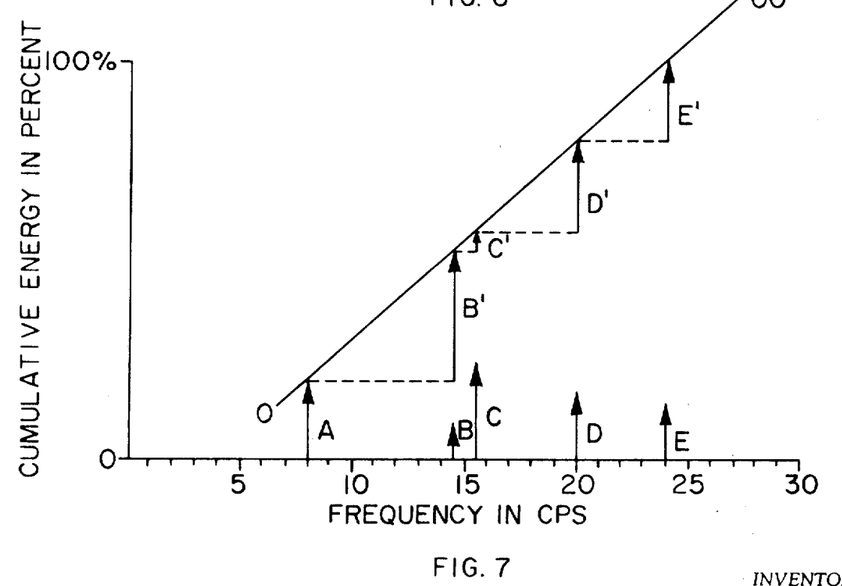

The manner of choosing, to a first approximation, the optimum weighting coefficients to do this is illustrated by the graphs of FIGS. 6 and 7. Suppose that the ordinates A, B, C, D, and E represent the energy contents of five different mono-frequencies derived from measurements of their recorded amplitudes in the output of a reference detector 12. Most conveniently, these can be determined by measuring the correlation-trace amplitudes at the zero-lag time position. That is, the correlation trace has at this time position a maximum value that is proportional to the mono-frequency wave amplitudes squared, summed over the wave-train duration, which represents energy. If these measured energy contents are equal and if they are uniformly distributed along a linear frequency scale as shown in FIG. 6, then they will correspond generally to an optimum Fourier series relationship of frequencies as taught in the above-mentioned McCollum U.S. Pat. No. 3,182,743, and all should have substantially the same weighting factor. That is, each mono-frequency adds an equal increment to some desired cumulative energy curve shown as the oblique straight line of FIGS. 6 and 7. If, on the other hand, and as is true in this example and shown in FIG. 7, the measured spectral energy contents are different for the different mono-frequencies, and the frequencies are unevenly distributed along the linear frequency scale, then the desired weighting factors are unequal and are given by the ratios $B'/B$, $C'/C$, $D'/D$, and so on. Although FIG. 7 shows only five energy values spread over the range from 8 to 24 cycles per second, a graphical solution for the 21 traces of FIG. 5 would have 21 values or ratios. Weighting factors determined in this way are what may be termed herein "linear" weighting factors.

Figure 8:
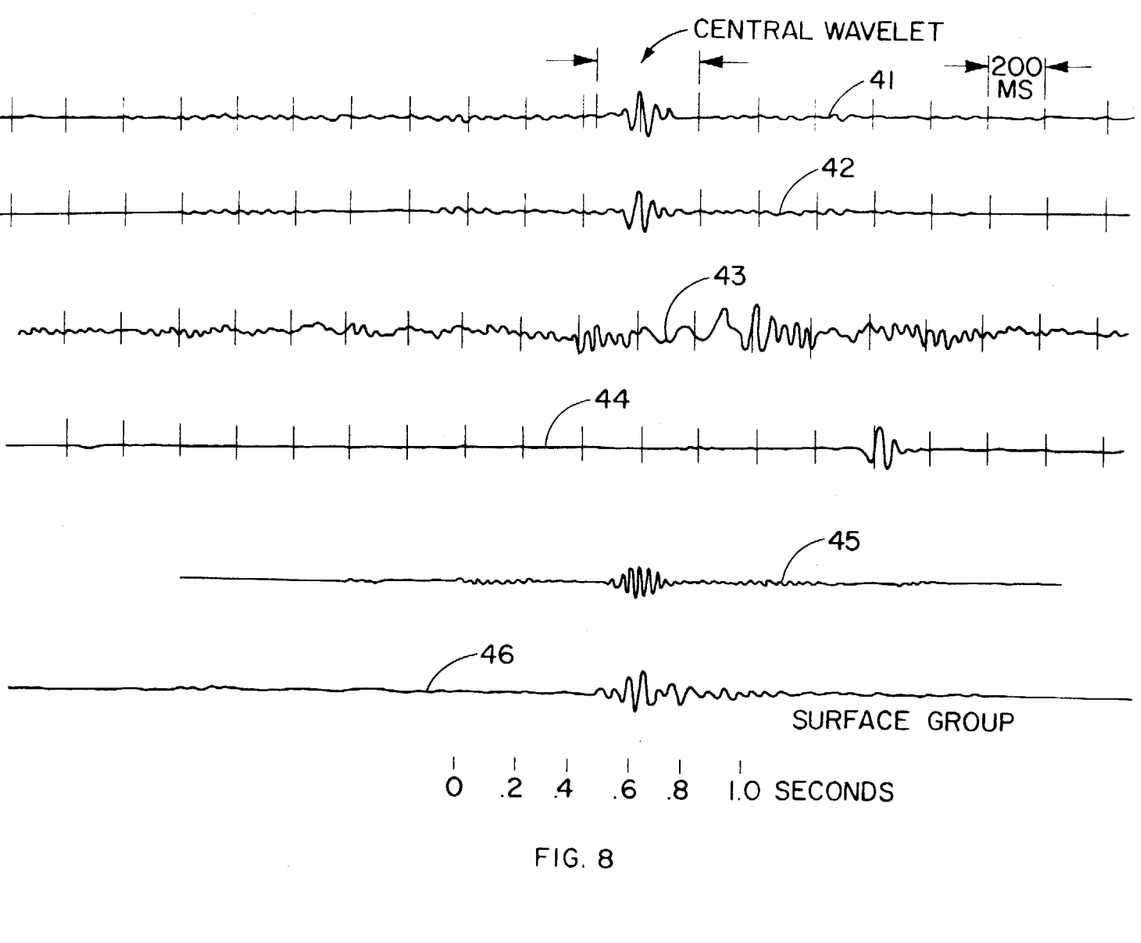
FIG. 8 is a graphical showing of summation traces based on the correlogram traces of FIG. 4 at various stages of the data-processing steps, together with a Wiener-filter operator function and traces produced using it.

The actual result of graphically determining such a set of 21 weighting factors, applying them to the 21 respective traces of FIG. 5, and summing the resulting linearly weighted traces is the trace 41 shown in FIG. 8. As was desired, this trace has one prominent central wavelet, which is preceded and followed by wavelets of considerably reduced but still appreciable amplitudes. The asymmetry of this wavelet, apparent in trace 41 compared to the symmetry of the 21 correlogram traces of FIG. 5, was in this instance ascertained to be due to a particular non-linear filter used in the computing and plotting devices for obtaining the graphical trace 41. Ordinarily, in the absence of such filter-phase distortion, this central wavelet will be symmetrical.

With the form of the central wavelet of trace 41 thus established, a new set of weighting factors, which are hereinafter called "optimum," for the correlogram traces of FIG. 5 is calculated by a computer program which makes a least-mean-squares error fit of an optimum weighted, zero-lag summation trace to a trace consisting only of the central wavelet and having zero amplitudes preceding and following it. This weighting factor determination is a special case of unit-length multichannel (21-channel) Wiener filter calculation in which the input data are the 21 correlogram traces of FIG. 5 and the desired output trace is one containing only the central wavelet of trace 41, all other amplitudes being zero. If $X_1, X_2, \ldots X_{21}$ respectively stand for the 21 time-function traces of FIG. 5, $w_1, w_2, \ldots w_{21}$ are the 21 unknown weighting factors to be determined, and D is the desired time-function trace containing the central wavelet alone, then their relationship can be written as the matrix equation $$\begin{bmatrix} X_1 \cdot X_1 & X_1 \cdot X_2 & \ldots & X_1 \cdot X_{21} \\ X_2 \cdot X_1 & X_2 \cdot X_2 & \ldots & X_2 \cdot X_{21} \\ X_{21} \cdot X_1 & X_{21} \cdot X_2 & \ldots & X_{21} \cdot X_{21} \end{bmatrix} \begin{bmatrix} w_1 \\ w_2 \\ w_{21} \end{bmatrix} = \begin{bmatrix} D \cdot X_1 \\ D \cdot X_2 \\ D \cdot X_{21} \end{bmatrix}$$

Here, the brackets [ ] denote a matrix, and the left side [ ] [ ] of the equation denotes matrix multiplication;

$$X_n \cdot X_m \text{ denotes } \int_{-\infty}^{+\infty} X_n(t) X_m(t) dt$$

and $$D \cdot X_n \text{ denotes } \int_{-\infty}^{+\infty} D(t) X_n(t) dt$$

or the equivalent digital summations.

The solution of this matrix equation for the weighting factors $w_1, w_2 \ldots w_{21}$, to be applied to the respective correlation traces of FIG. 5 before summation, by a digital computer program into which the X's and D are introduced in digital form, is routine in the digital computer program art, so that no further detailed description is deemed necessary here. See, for example, chapters 5 and 6 of Multichannel Time Series Analysis With Digital Computer Programs by Enders A. Robinson, published by Holden-Day, Inc., San Francisco (1967).

These optimum weighting factors $w_1, w_2 \ldots w_{21}$ differ only in minor respects from the linear approximate factors, determined on the basis of uniform energy distribution as illustrated in FIGS. 6 and 7. This is demonstrated by the trace 42 of FIG. 8 which represents the summation of the monitor-receiver correlogram traces using the recomputed or optimum weighting factors. Here it is apparent that the central wavelet is altered in form only in very minor respects, while the preceding and following wavelets are appreciably reduced in amplitude compared to trace 41, though they are by no means reduced to zero amplitude. The optimum weighting coefficients thus determined are those which are used in the subsequent time-compression of the spread seismometer traces.

The final step of time-compression of the monitor-seismometer signals is to compute a Wiener-filter operator which can convert trace 42 to a trace containing only the central wavelet and in which the amplitudes of the preceding and following wavelets are reduced much closer to zero value than can be accomplished by the simple weighted summation alone. That is, optimum summation trace 42 with its small noise preceding and following the central wavelet is taken as the input trace, and the same trace with all amplitudes zero outside of its central wavelet is taken as the desired output trace. By a conventional digital computer program, a single-channel Wiener filter operator is computed which produces, with trace 42 as the filter input, an actual output trace matching the desired trace with a minimum mean-square error overall. See, for example, section 6.1 of Robinson, cited above, for a discussion of Wiener filters and their design. In the terminology of Robinson, the present case is one of signal enhancement with delay. Quite detailed programs are given in a paper by Robinson entitled "Collection of Fortran II Programs for Filtering and Spectral Analysis of Single Channel Time Series," published as Supplement No. 1 (Mar., 1966) to Volume XIV of Geophysical Prospecting.

Trace 43 of FIG. 8 is the form of the Wiener filter operator actually computed to obtain this result for the trace 42, and trace 44 of this figure is the resulting trace produced by the action of filter operator 43 on trace 42. As this trace shows, there is very little wave energy present on trace 44 outside of the central wavelet, which is now appreciably delayed in time. This delay, however, is meaningless as it can readily be determined and allowed for.

The significance of using proper weighting factors to obtain traces 41 and 42 is made clear by trace 45 of FIG. 8, which trace is a direct summation of the non-weighted correlogram traces of FIG. 5. The considerable simplification of the central wavelet of the summation trace by the use of proper weighting factors is believed clear. It should also be understood that the Wiener-filter operator of trace 43, which further improves the apparent concentration of energy into the central wavelet of trace 42, is much shorter in length, and thus more economical as regards computer handling time, than would be an operator capable of directly time-compressing the received mono-frequency signals in the absence of the preceding correlation, weighting, and summation steps.

A set of optimum weighting factors and a Wiener-filter operator having been thus established for time-compressing the signals of reference seismometer 12, the process of time-compressing the received-wave traces made by seismometers 13–16 comprises the steps of, for each spread seismometer trace, first cross-correlating it with each individual mono-frequency wave train that produced it to obtain 21 correlogram traces, weighting the respective correlogram traces with the determined optimum weighting factors used in producing trace 42, summing the resulting weighted correlogram traces, filtering the summation trace using the Wiener-filter operator of trace 43, and recording the output of the Wiener filter as the final time-compressed trace showing event-arrival times and thus constituting the primary data for display or further processing such as weathering and elevation corrections, moveout removal, deconvolution, frequency filtering, and the like.

Trace 46 of FIG. 8 is an example of the time-compressed trace which results from applying the foregoing described steps of cross-correlation, optimum weighting, summation, and Wiener filtering to the received-wave output of a surface seismometer or seismometer group such as that corresponding to the seismometer 13 of FIG. 1. That is, the seven recorded seismometer-output traces are cross-correlated with the 21 mono-frequency signals forming the set shown in FIG. 3, and the resulting twenty-one correlogram traces are weighted using the weighting factors obtained by linear energy distribution and least-mean-squares curve fitting on the reference seismometer trace, followed by summation and Wiener filtering with the operator of trace 43. This particular trace was obtained in a prospecting area and under conditions such that only a very few early arrivals were obtained and recorded. In normal prospecting use employing greater vibrator input energy in seismically sensitive areas, a great many more and later events would be obtained and observed on each time-compressed spread seismometer trace.

The range of frequencies from 8.2 to 23.3 cycles per second used in this example is of no particular significance, as the chosen frequency range employed in any given prospecting area will depend upon the characteristics of the area, and the objectives of the prospecting program. That is, for obtaining reflections from shallow horizons or for resolving thin beds, higher frequencies, such as in a range from 40 to 100 or more cycles per second, may be employed, while if the objective is to obtain reflections from deep horizons in areas where high frequencies are rapidly attenuated, a range of low frequencies such as that actually employed in this example may be suitable. The factors leading to selection of the proper frequency range are in any event well known to those skilled in seismic geophysical surveying and are not essentially different with regard to the present invention than in conventional prospecting. It should be noted, however, that the use of mono-frequencies, as taught herein without limitation to the exact frequencies of Fourier series terms, as compared with the use of continuously varying frequencies, permits the design and operation of resonant forms of the vibrator 11 of substantially higher efficiency than conventional vibrators, which must be capable of relatively uniform response over a quite wide frequency range.

While my invention has thus been described in terms of the foregoing specific embodiment and details, still further embodiments and modifications thereof will now be apparent to those skilled in the art, so that the invention should not be considered as limited in scope to the described details but is properly to be ascertained from the appended claims.

I claim:

1. The method of time-compressing received multi-transmission signals which are of similar form but differ in peak spectral frequency between $n$ successive transmissions, which method comprises the automatic machine-process steps of:

for each receiver location, cross-correlating each of said $n$ transmitted signals with each received-signal trace containing it, to produce $n$ correlation functions, adjusting the amplitudes of said correlation functions by applying thereto relative weighting factors that produce, in a summation trace, the simplest form of central wavelets representing corresponding seismic-wave arrivals and minimum amplitudes outside of said central wavelets, summing said weighted correlation functions with their zero-lag times in coincidence to produce said summation trace, and filtering said summation trace by a Wiener-filter operator that reduces said summation-trace amplitudes substantially to zero outside of said central wavelets.

2. The method of claim 1 in which said relative weighting factors are determined by the steps which comprise:

during said $n$ successive transmissions, making a reproducible reference recording of the output of a reference receiver at the seismic-wave transmitting location, said output corresponding to said $n$ multi-transmission signals as they are introduced into the earth at said transmitting location, reproducing said reference recording as corresponding multi-transmission reference signals, cross-correlating each individual one of the $n$ multi-transmission reference signals with the reference-signal trace which contains it, which trace may also contain one or more others of said reference signals transmitted in sequence, to produce $n$ reference correlogram traces, plotting, along a linear frequency scale, at the position of each respective peak spectral frequency, an ordinate proportional to the energy density of each corresponding multi-transmission reference signal, and determining, for each ordinate in succession, a multiplying factor such that the energy increment it then represents causes the total cumulative energy to increase substantially linearly with frequency, said multiplying factors being approximately proportional to said weighting factors.

3. The method of claim 2 including the further steps of:

summing said $n$ reference correlogram traces weighted by said multiplying factors to obtain a first reference summation trace having one central wavelet preceded and followed by waves of substantially reduced amplitudes relative to said wavelet, and calculating a second set of multiplying factors for said reference correlogram traces to produce a second reference summation trace having a least-mean-squares fit to a trace consisting of said central wavelet alone, said second multiplying factors being proportional to optimum values of said weighting factors.

4. The method of claim 3 in which said Wiener-filter operator is calculated on the basis of said second reference summation trace, to reduce the wave amplitudes preceding and following said central wavelet substantially to zero.

5. The method of claim 1 in which each of said $n$ multi-transmission signals is transmitted by the step of controlling a seismic-wave generating vibrator at a transmitting location by a pilot signal that produces a mono-frequency wave train in the general form of an abruptly terminated constant-frequency sinusoid a plurality of cycles in length.

6. The method of claim 5 in which a plurality of said mono-frequency wave trains of different spectral peak frequencies are transmitted in close succession as a group of mono-frequencies.

7. The method of claim 6 in which a plurality of said mono-frequency train groups are transmitted and received one group at a time, until said $n$ signals having spectral peak frequencies distributed throughout a desired frequency range have been transmitted and received.

8. Apparatus for time-compressing multi-transmission signals received at a receiver location, which signals are of similar form but differ in peak spectral frequency between $n$ successive transmissions, comprising, in combination, means for cross correlating each of said $n$ transmitted signals with each received-signal trace containing it, to produce $n$ correlation functions, means for adjusting the amplitudes of said correlation functions by applying thereto optimum relative weighting factors that produce, in a summation trace, the simplest form of central wavelets representing corresponding seismic-wave arrivals and minimum amplitudes outside of said central wavelets, means for summing said weighted correlation functions with their zero-lag times in coincidence to produce said summation trace, and means for filtering said summation trace by a Wiener-filter operator that reduces said summation-trace amplitudes substantially to zero outside of said central wavelets.

* * * * *